(12) United States Patent
Kostrzewa

(10) Patent No.: US 8,313,629 B2
(45) Date of Patent: Nov. 20, 2012

(54) WATER RECLAMATION SYSTEMS AND METHODS

(75) Inventor: Andre Kostrzewa, Salt Lake City, UT (US)

(73) Assignee: Sweetwater Reclamation, LLC, Tooele, UT (US)

( * ) Notice: Subject to any disclaimer, the term of this patent is extended or adjusted under 35 U.S.C. 154(b) by 1030 days.

(21) Appl. No.: 12/199,664

(22) Filed: Aug. 27, 2008

(65) Prior Publication Data

US 2010/0051463 A1    Mar. 4, 2010

(51) Int. Cl.
*C02F 1/46* (2006.01)
*C02F 1/48* (2006.01)

(52) U.S. Cl. ........ 204/554; 204/555; 204/556; 204/660; 204/661

(58) Field of Classification Search .......... 204/554–557, 204/660–674
See application file for complete search history.

(56) References Cited

U.S. PATENT DOCUMENTS

| | | | |
|---|---|---|---|
| 4,747,920 A | 5/1988 | Muralidhara et al. | |
| 5,049,248 A | 9/1991 | Muralidhara et al. | |
| 5,259,940 A | 11/1993 | Candor | |
| 5,464,513 A | 11/1995 | Goriachev et al. | |
| 5,948,273 A * | 9/1999 | Yoshida et al. | 205/751 |
| 6,325,916 B1 * | 12/2001 | Lambert et al. | 205/751 |
| 6,802,981 B2 | 10/2004 | Ryazanova et al. | |
| 2004/0084382 A1 | 5/2004 | Ryazanova | |
| 2006/0054568 A1 | 3/2006 | Jones | |
| 2007/0029201 A1 | 2/2007 | Suominen | |
| 2007/0029261 A1 | 2/2007 | Chew | |

FOREIGN PATENT DOCUMENTS

| | | |
|---|---|---|
| DE | 10335880 | 3/2005 |
| DE | 10335891 | 3/2005 |
| GB | 1270971 | 4/1972 |
| RU | 2183197 | 6/2002 |
| WO | 2008052233 | 5/2008 |

OTHER PUBLICATIONS

TR3 Engergy, Inc. Capacitive Deionization Process; http://www.tr3energy.com/tr3energy/inform/water-treatment1.html.

* cited by examiner

*Primary Examiner* — Arun S Phasge
(74) *Attorney, Agent, or Firm* — Kirton McConkie; Michael F. Krieger

(57) ABSTRACT

Water treatment, reconditioning, and reclamation systems and methods are described. The systems utilize two treatment vectors. The first treatment vector is created by flowing electrical current through a first conductive rod. The second treatment vector is created by delivering a magnetic pulse by way of a second conductive rod. Water to be treated is exposed to the two vectors simultaneously, which is accomplished by creating relative motion between the conductive rods and the water, either by moving the conductive rods or by moving the water. The electric current of the first treatment vector and the voltage and frequency of the magnetic pulse of the second treatment vector may be reduced as the treatment process proceeds. During treatment, total dissolved solids (TDS) rise and congeal at the top of the water. The congealed TDS are removed from the water. An additional filtering process may be applied.

20 Claims, 4 Drawing Sheets

WATER RECLAMATION SYSTEMS AND METHODS

BACKGROUND OF THE INVENTION

1. Field of the Invention

The present invention relates to water reclamation systems and methods, and more particularly to low-cost and high-efficiency water purification and reclamation systems.

2. Background and Related Art

One of the most important and limited resources in many locations around the world is clean water. In many locations, people suffer from inadequate supplies of clean water for drinking, agriculture, and many other uses. In many such instances, water is available, but is unusable due to contaminants, salts, and other impurities. Such water includes human waste water, agricultural waste water, industrial waste water, waste water from other processes, runoff water contaminated by ground contaminants, water in seas and oceans, etc. Currently-available systems and methods for treatment and purification of such water are expensive, inefficient, and ill-adapted for satisfying current and future needs.

One indicator of water quality is total dissolved solids (TDS). TDS are defined as the quantity of dissolved material in water, and are typically expressed in units of milligrams per liter (mg/l). One way to estimate the TDS in water is by measuring a water sample's conductivity. Conductivity is the ability of a material (in this case water) to conduct electricity. Pure water is not very conductive, while contaminated water conducts more electricity due to the dissolved solids and salts that carry electric charges. Therefore, measuring the conductivity of water indirectly indicates the amount of TDS in the water.

Conductivity may be measured in micromhos per centimeter ($\mu$mhos/cm) or microsiemens per centimeter ($\mu$S/cm). These are equivalent units of measure that can be used interchangeably. For reference, typical conductivity ranges for different sources of water are as follows: pure water—0.055 $\mu$S/cm; distilled water—0.5 to 3.0 $\mu$S/cm; melted snow—2 to 42 $\mu$S/cm; drinking water—30 to 1,500 $\mu$S/cm; freshwater streams—100 to 2,000 $\mu$S/cm; ocean water—on the order of 32,000 to 56,000 $\mu$Scm.

BRIEF SUMMARY OF THE INVENTION

Implementation of the invention provides water treatment, reconditioning, and reclamation systems and methods that are efficient and effective. The systems utilize two treatment vectors as part of the basic treatment process. The first treatment vector is created by flowing electrical current through a first conductive rod. The second treatment vector is created by delivering a magnetic pulse by way of a second conductive rod. Water to be treated is exposed to the two vectors simultaneously, which is accomplished by creating relative motion between the conductive rods and the water, either by moving the conductive rods or by moving the water.

In implementations of the invention, efficiency is improved and electrical power requirements are reduced by adjusting the electric current of the first treatment vector and the voltage and frequency of the magnetic pulse of the second treatment vector as the treatment process proceeds. As the treatment process proceeds, total dissolved solids (TDS) rise and congeal at the top of the water surface. Once treatment is complete, the congealed TDS are removed from the water, such as by skimming. The treated water may then be used, or an additional filtering process may be applied.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide water treatment, reconditioning, and reclamation systems and methods that are efficient and effective. The systems utilize two treatment vectors as part of the basic treatment process. The first treatment vector is created by flowing electrical current through a first conductive rod. The second treatment vector is created by delivering a magnetic pulse by way of a second conductive rod. Water to be treated is exposed to the two vectors simultaneously, which is accomplished by creating relative motion between the conductive rods and the water, either by moving the conductive rods or by moving the water.

In embodiments of the invention, efficiency is improved and electrical power requirements are reduced by adjusting the electric current of the first treatment vector and the voltage and frequency of the magnetic pulse of the second treatment vector as the treatment process proceeds. As the treatment process proceeds, total dissolved solids (TDS) rise and congeal at the top of the water surface. Once treatment is complete, the congealed TDS are removed from the water, such as by skimming. The treated water may then be used, or an additional filtering process may be applied.

Figure 1:
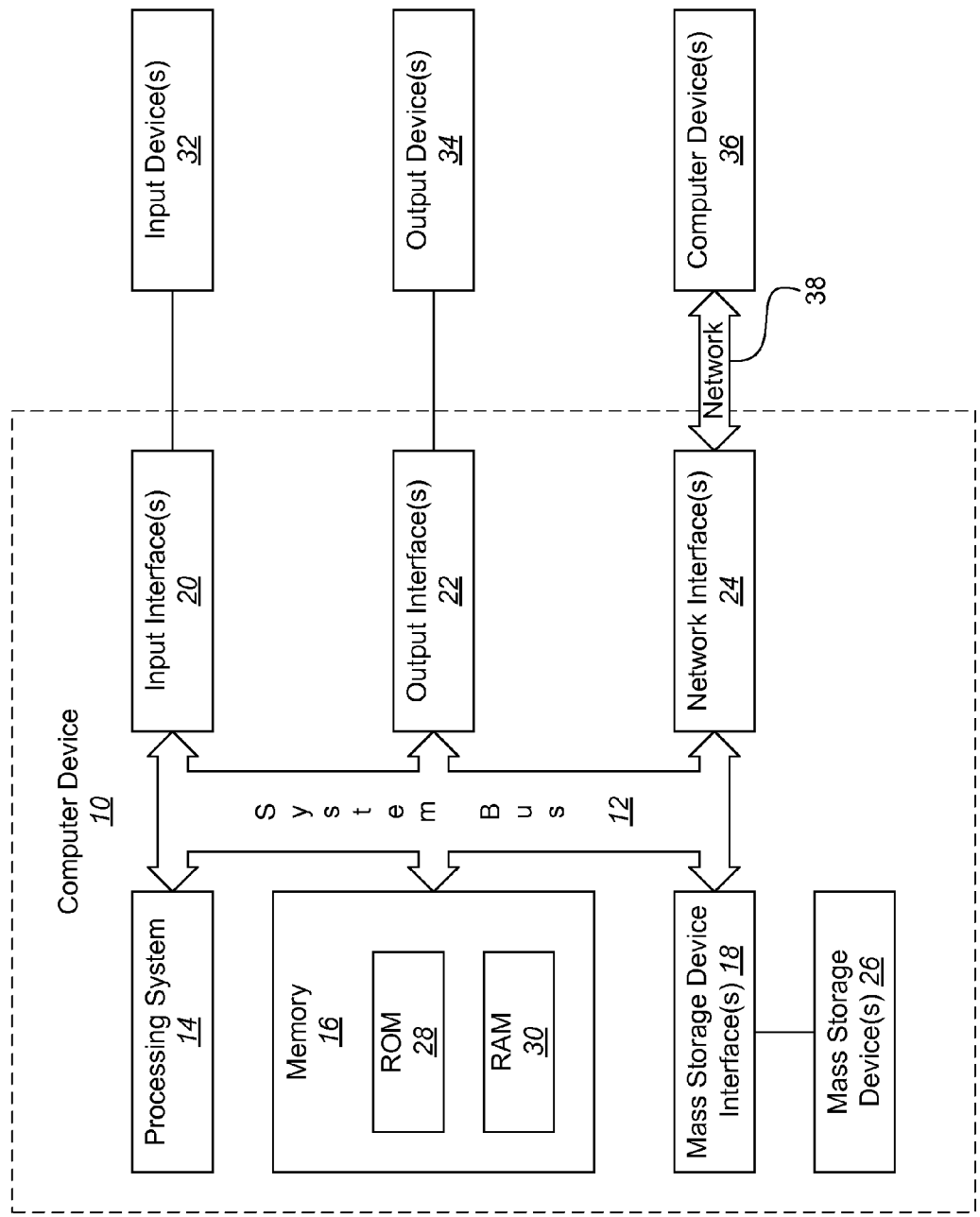
FIG. 1 illustrates a representative computer system for use with embodiments of the present invention.

As at least some embodiments of the invention are envisioned to utilize a control system that may include a computer or computing device, FIG. 1 and the corresponding discussion are intended to provide a general description of a suitable operating environment for implementation with embodiments of the invention. One skilled in the art will appreciate that embodiments of the invention may be practiced using one or more computing devices and in a variety of system configurations, including in a networked configuration. Embodiments of the present invention include utilization of the methods and processes in a variety of environments, including embedded systems with general purpose processing units, application specific integrated circuits (ASIC), stand alone electronic devices, and other such electronic environments.

Embodiments of the present invention embrace one or more computer readable media, wherein each medium may be configured to include or includes thereon data or computer executable instructions for manipulating data and/or controlling devices. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer-executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing embodiments of the invention includes computer device 10, which may be a general-purpose or special-purpose computer. Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a sensor such as a conductivity sensor, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a motor, a valve, any other device controlled by the computer device 10, and the like. A particular output device 34 may be integrated with or peripheral to computer device 10. Examples of output interfaces include a video adapter, an audio adapter, a parallel port, and the like.

One or more network interfaces 24 may be included to enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Therefore, embodiments of the invention embrace one or more general-purpose or specific-purpose computer devices to control functions of the systems and methods described herein. The computer device or devices may be part of a control box that may drive electric current and/or magnetic pulses through conductive rods, as discussed hereunder, according to predetermined treatment protocols while simultaneously determining treatment results, such as by a conductivity meter or other similar device for measuring or approximating conductivity. Although it is envisioned that any target conductivity can be selected as representing confirmation of treatment, embodiments of the invention utilize a target conductivity to represent confirmation of treatment of approximately 120 μS/cm, this value falling well within the conductivity of typical drinking water. Other potential target conductivities include any known range for a desired water quality, including the ranges set forth in the Background, above. Therefore, in accordance with embodiments of the invention, treatment utilizing the below-described methods and devices continues until the desired target conductivity is reached.

Figure 2:
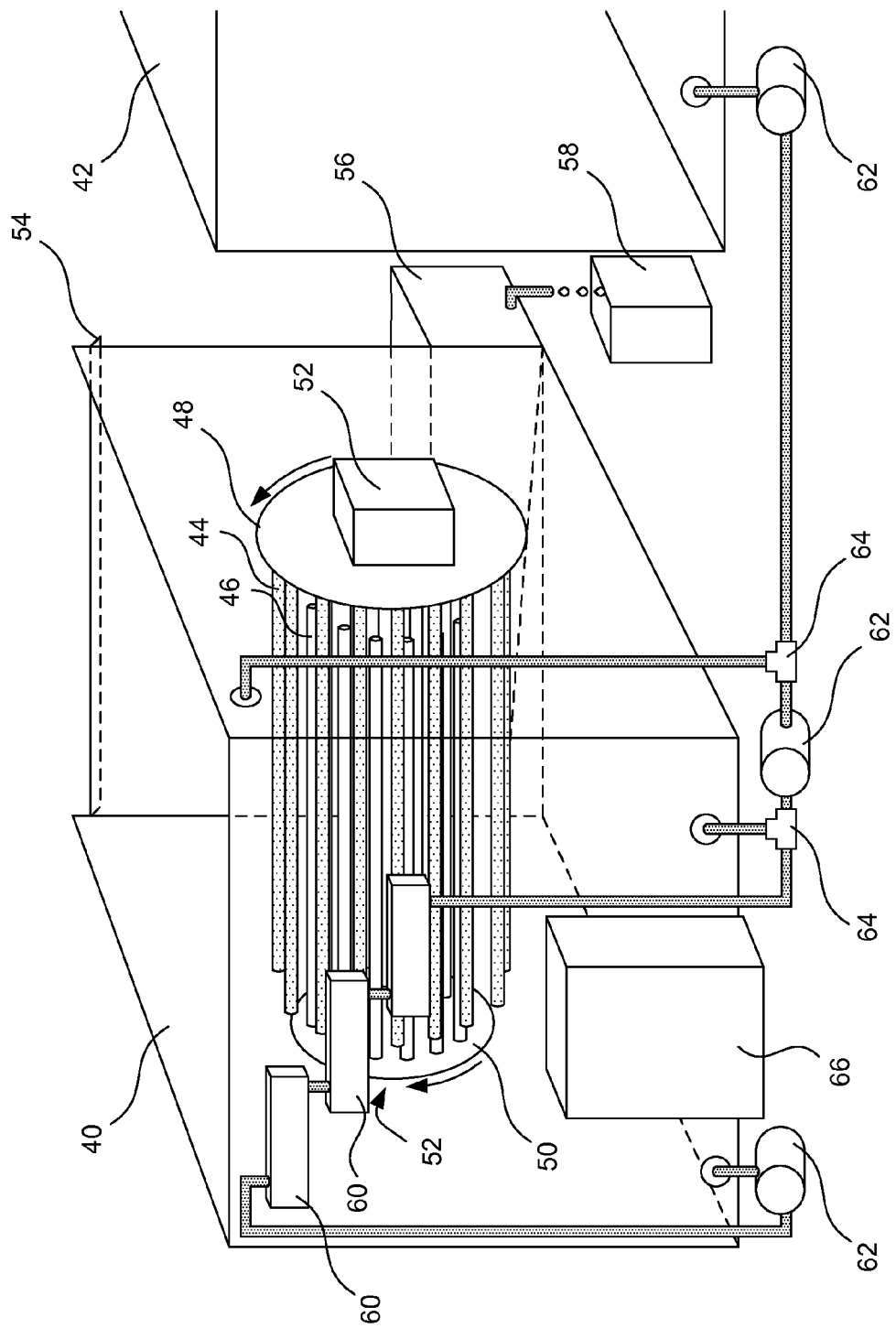
FIG. 2 shows a representative embodiment of a water reclamation system.
Figure 3:
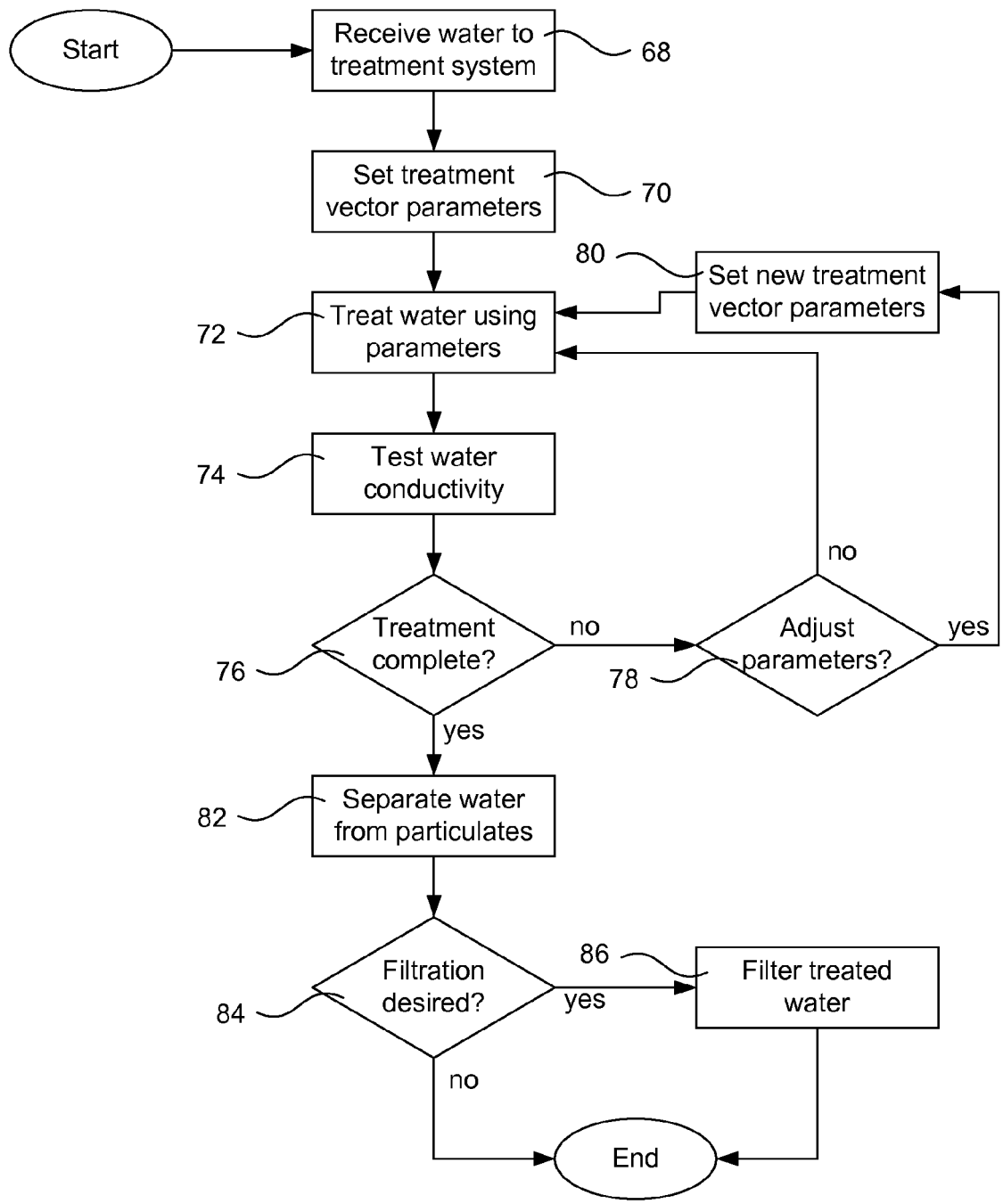
FIG. 3 illustrates a process for water treatment in accordance with embodiments of the present invention.

FIG. 2 shows a perspective view of an embodiment of a representative water reclamation system. All features illustrated in FIG. 3 are representative and may not be to scale. For convenience in understanding the illustrated embodiment, some features may have been enlarged and/or omitted. The system includes a treatment tank 40 and a reconditioned water storage tank 42. The treatment tank 40 is made of a non-conductive material, such as plexiglass. Any other non-conductive and non-reactive material may be used for the treatment tank 40. The treatment tank 40 may be sized to accommodate the water-treatment needs for the system: in situations where treatment of larger quantities of water is needed, the treatment tank 40 may be of a larger size, and where treatment of smaller quantities of water is needed, the treatment tank 40 may be of a smaller size. In the illustrated embodiment, the treatment tank 40 is approximately cubical in shape, and has dimensions of approximately four feet to a side and in height. A treatment tank 40 of this size can hold and treat batches of water of approximately 450 to 500 gallons. Treatment tanks 40 of other sizes may be provided by varying the size and number of the other components of the system discussed below.

Water to be treated, reconditioned, or reclaimed is pumped or otherwise introduced to the treatment tank 40, where it is exposed to two treatment vectors in the treatment process. The first treatment vector is created by flowing electrical current through a first conductive rod 44. The second treatment vector is created by delivering a magnetic pulse through a second conductive rod 46. The first conductive rod 44 and the second conductive rod 46 are located in the treatment tank 40 and may be substantially parallel to each other. Water to be treated is exposed to the first conductive rod 44 and the second conductive rod 46 simultaneously in the treatment tank 40. To ensure consistent exposure of all the water to be treated to both the first conductive rod 44 and the second conductive rod 46, movement of the first conductive rod 44 and the second conductive rod 46 is created relative to the water in one of several fashions.

The first fashion is illustrated in FIG. 2. In this case, the first conductive rod 44 and the second conductive rod 46 are moved radially with respect to the water and each other. This effectively mixes the water during treatment. In this case, a plurality of the first conductive rods 44 is connected to a first bracket 48. The first bracket 48 may be of any desired shape, and in the illustrated embodiment the first conductive rods 44 are arranged in a circle substantially equidistant from a center of the first bracket 48. The first bracket 48 is rotatably mounted within the treatment tank 40, with the first conductive rods 44 extending into the treatment tank 40. A plurality of the second conductive rods 46 is connected to a second bracket 50, which is rotatably mounted within the treatment tank 40 opposite the first bracket 48. The centers of rotation of the first bracket 48 and the second bracket 50 substantially lie on a common line that may be substantially parallel to the first conductive rods 44 and the second conductive rods 46.

The second conductive rods 46 also extend from the second bracket 50 into the treatment tank 40, but are connected to the second bracket 50 at a distance from the center of the second bracket 50 that is different from the distance between the first conductive rods 44 and the center of the first bracket 48. In this way, the rod arrays are concentrically arranged so that the first conductive rods 44 are either outside the second conductive rods 46 (as illustrated in FIG. 2) or are inside the second conductive rods 46 (not shown). One or both of the rod arrays may be rotated by one or more motors 52, and if both rod arrays are driven by motors 52, they may be counter-rotated, as shown by the arrows indicating direction of rotation in FIG. 2.

The second fashion for moving the first conductive rod 44 and the second conductive rod 46 relative to the water is achieved by moving the first conductive rod 44 and the second conductive rod 46 linearly with respect to the water. The third fashion for moving the first conductive rod 44 and the second conductive rod 46 relative to the water is to flow the water past static rod arrays. In any of the three fashions, the distance between the first conductive rod(s) 44 and the second conductive rod(s) 46 need not be exact, but is on the order of approximately twenty times the diameter of the first conductive rod 44 and the second conductive rod 46. It has been found that when the first conductive rods 44 and the second conductive rods 46 are too close together, undesirable heat is generated.

In the illustrated embodiment, the first treatment vector is applied using direct current voltages (VDC) during the treatment process ranging from twelve to two hundred fifty volts. To minimize total electrical power requirements of the treatment process, the voltage may be adjusted at discretionary intervals (e.g. fifteen minutes) by way of a programmable logic controller (PLC) or other computer-type device. During treatment using the illustrated embodiment, the voltage begins at two hundred fifty volts for the first treatment interval. The voltage level during subsequent intervals is established by measuring the conductivity of the treatment water and dividing the conductivity in μS/cm by a factor of ten microsiemens per volt-centimeter: 1,200 μS/cm/10 μS/(V·cm)=120 volts; 800 μS/cm/10 μS/(V·cm)=80 volts; etc. Treatment is considered complete when the conductivity reaches the target conductivity, such as 120 μS/cm. Treatment is effective without reducing the voltage as described herein, but the process is not as energy efficient. If water having conductivity measurements above 2,500 μS/cm is to be treated, the voltage level may remain at two hundred fifty volts until the measured conductivity is less than 2,500 μS/cm.

The second treatment vector of the illustrated embodiment is applied using direct current voltages (VDC) at a frequency to induce a magnetic pulse. As with the first treatment vector, the voltage and frequency may be adjusted at discretionary intervals (e.g. fifteen minutes, to match the first treatment vector, or on any other desired interval that matches or does not match the first treatment vector interval) by way of a PLC or other computer-type device to minimize total electrical power requirements. During treatment using the illustrated embodiment, for example, the VDC initiates at 32 volts and the frequency initiates at 7.9 Hertz (Hz). One way the VDC and frequency levels during subsequent intervals are established is by multiplying their previous levels by the ratio of the conductivity of the present interval ($I^{n+1}$) to the conductivity of the previous interval ($I^n$). As an example, if the first conductivity measurement is 1,200 μS/cm and the second conductivity measurement is 800 μS/cm, then ($I^{n+1}$)/($I^n$)=800 μS/cm/1,200 μS/cm=0.67, and in the illustrated example, the VDC would be reduced to 24 volts and the frequency to 5.27 Hz. As with the first treatment vector, reduction of the VDC and frequency levels of the second treatment vector may be delayed until the treatment water conductivity is at or below a certain value, such as 2,500 μS/cm.

Although the specifically-illustrated embodiment has been discussed with voltages for the first treatment vector of between twelve and two hundred fifty volts, other voltage ranges may be used with other embodiments, including voltages of between five volts or less and five hundred volts or more, either at the start of treatment or at some later point during treatment. Additionally, the second treatment vector may include magnetic-pulse generating voltages of between one volt and sixty volts or more, and at frequencies of between a fraction of a Hertz to frequencies of tens of Hertz.

TDS particulates rise and congeal at the top of the treatment water surface within the treatment tank 40 throughout the treatment process. After treatment is complete, the particulates are skimmed from the treated water surface. The particulates may be skimmed by way of a weir 54 into a slurry basin 56, and inert waste 58 from the slurry basin 56 is disposed of appropriately. When needed, the treated water may be filtered using a single or multiple-stage (e.g. a three-stage) ionization filter system using one or more ionization filters 60. The treated filtered water is then pumped to the reconditioned water storage tank 42 by one or more pumps 62. The flow of pumped or circulated water may be controlled by three-way valves 64, as illustrated in FIG. 2. The pumps 62, motors 52, and three-way valves 64, may be controlled by a centralized control box 66 that may also include the PLCs or other computer-type devices and sensor equipment controlling the first and second treatment vectors. The control box 66 also includes current and magnetic pulse generators electrically connected to the first conductive rods 44 and the second conductive rods 46, respectively, and controlled by the PLCs or other computer-type devices of the control box 66. Although a single control box 66 is illustrated in FIG. 2, it will be appreciated that the features and components of the control box 66 may be provided by multiple control boxes 66 and/or multiple discrete elements.

The pumps 62 and three-way valves 64 may also be controlled by the control box 66 to provide recirculating flow to the treatment water during the treatment process. Although FIG. 2 shows treated water being stored in the storage tank 42, treated water may be immediately supplied for consumption, or it may be discharged to receiving waters.

In embodiments such as that illustrated in FIG. 2, the rate of rotation of the first conductive rod array and the second conductive rod array may be timed so that application of the magnetic pulse of the second treatment vector coincides with the closest approach of the first conductive rods 44 with the second conductive rods 46. As may be appreciated from FIG. 2, the closest approach of the first conductive rods 44 to the second conductive rods 46 repeatedly occurs as the first and second rod arrays counter-rotate. Thus, where timing of the magnetic pulse occurs with closest approach, a magnetic pulse need not be applied at each closest approach, but may be applied at each second, third, fourth, etc. closest approach. Exemplary rotation speeds for the embodiment illustrated in FIG. 2 are between ten and twelve revolutions of each rod array per minute.

The first conductive rods 44 and the second conductive rods 46 may be manufactured of a variety of materials. In one group of embodiments, the first conductive rods 44 and the second conductive rods 46 include non-ferrous alloys. For example, the first conductive rods 44 and the second conductive rods 46 may include magnesium alloys and bauxite/aluminum alloys. In another group of embodiments, conductive ceramics may be used for the first conductive rods 44 and the second conductive rods 46 to prevent corrosion and/or coating with salts. It is anticipated that a wide variety of materials may be used for the first conductive rods 44 and the second conductive rods 46, and the specific embodiments discussed above are to be taken as merely illustrative.

Additionally, the treatment parameters set forth above are to be considered merely illustrative. The treatment parameters set forth above have been determined to be effective for a broad range of contaminants and contaminant concentrations, but it is anticipated that the parameters may be varied utilizing apparatuses similar to those discussed and illustrated to achieve similar results. For example, in some embodiments, such as embodiments for removing salts from the water, the treatment water may be pressurized to improve efficiency in removing the salts. Additionally, it may be determined that different compositions of the first conductive rods 44 and the second conductive rods 46 function best for treating certain types of water.

A process in accordance with embodiments of the invention is illustrated by FIG. 3. Execution begins at step 68, where water is received into a suitable treatment system, such as the treatment tank 40 illustrated in FIG. 2. At step 70, the treatment parameters are set for the treatment vectors. The setting of the treatment parameters may be based upon an initial conductivity measurement, it may be set based on a default set of vector parameters, or it may be set upon some set of know qualities of the water to be treated. After the parameters are set, treatment of the water using the parameters proceeds at step 72.

After some desired period of time, execution proceeds to step 74, where a conductivity test is made. Based on the result of the conductivity test, a determination is made at decision block 76 whether treatment is complete (i.e. whether the target conductivity has been reached). If it is determined that treatment is not complete, execution proceeds to decision block 78, where a determination is made as to whether to adjust the treatment parameters. In some embodiments, no adjustment is ever made, and so execution immediately returns to step 72 for treatment. In other embodiments where adjustment is made, the determination is based on the measured water conductivity and any other desired factors. If no adjustment is necessary or desired, execution proceeds to step 72 for treatment; however, when adjustment is desired, execution proceeds to step 80 where new treatment parameters for the treatment vectors are set. After the new parameters are set, execution returns to step 72 for treatment of the water using the new parameters, whereupon execution loops until it is determined at decision block 76 that treatment is complete (e.g. that the measured conductivity is at or below the desired level).

Once it has been determined that treatment is complete, execution proceeds to step 82, where the water is separated from the congealed particulates, such as by skimming the particulates from the top of the treatment tank 40 as discussed above. Execution then proceeds to step 84, where a determination is made whether any filtration is desired, such as for human consumption. If filtration is not desired, the water is ready for use or discharge, and execution ends; however, if filtration is desired, execution proceeds to step 86, where the water is further treated using a filtration process, after which the water is ready for use or discharge, and execution ends.

Figure 4:
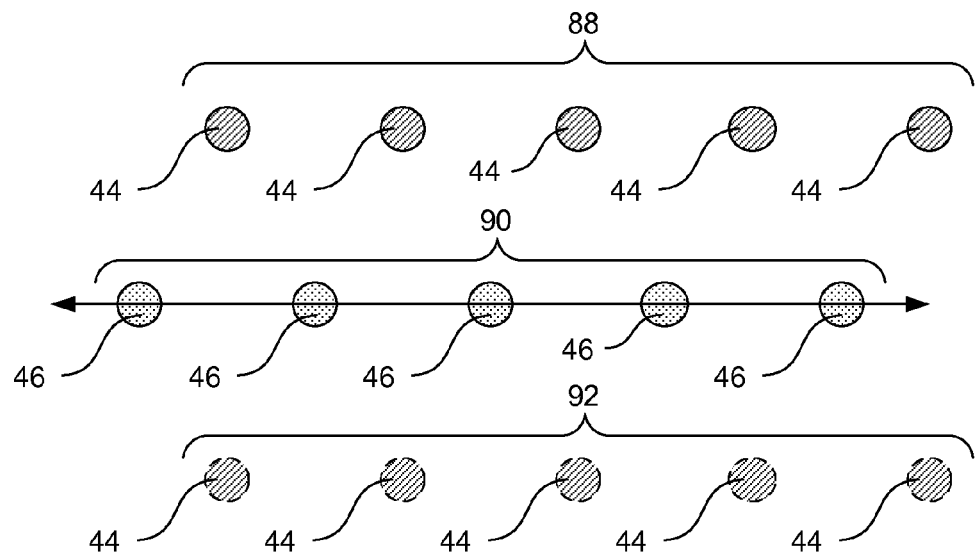
FIG. 4 illustrates an alternate rod arrangement and rod-to-water movement for use with embodiments of the invention.
Figure 5:
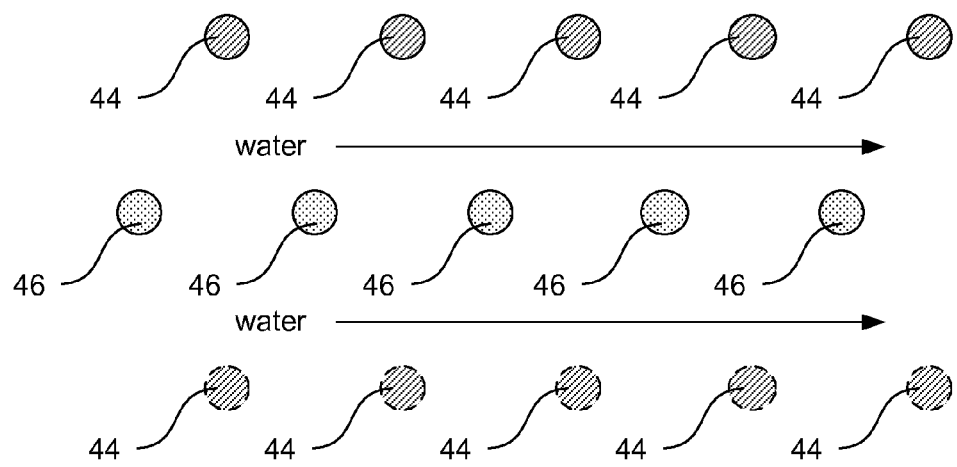
FIG. 5 illustrates a further alternate rod arrangement and rod-to-water movement for use with embodiments of the invention.

As discussed above, various rod arrangements and methods for providing movement of the first conductive rods 44 and the second conductive rods 46 relative to the water may be provided. FIGS. 4 and 5 illustrate two such embodiments. The first conductive rods 44 and the second conductive rods 46 have been exaggerated in size and placement for purposes of clarity of the discussion in FIGS. 4 and 5. As discussed above, the rod spacing can be varied and in many embodiments is on the order of approximately twenty rod diameters. FIGS. 4 and 5 illustrate the alternate arrangements of the first conductive rods 44 and the second conductive rods 46 with cross-sectional views taken perpendicularly to the rod long axes.

In FIG. 4, a linear array 88 of the first conductive rods 44 is provided in a spaced apart relationship from a linear array 90 of the second conductive rods 46. In some embodiments, an optional third linear array 92 of the first conductive rods 44 (and additional linear arrays not illustrated alternating between the first conductive rods 44 and the second conductive rods 46 as desired) may be provided. Motion between the linear array 88 and the linear array 90 may be provided by moving the linear array 90 (and any associated additional linear arrays of the second conductive rods 46) in the fashion illustrated in FIG. 4. Alternatively, the linear array 88 (and any associated additional linear arrays of the first conductive rods 46) may be moved similarly, or both types of linear arrays (linear array 88 and linear array 90) may be moved, such as in opposite directions periodically reversing. In all such embodiments, the linear motion is oscillatory, e.g. back and forth.

In FIG. 5, though not specifically annotated, similar arrangements of linear arrays such as linear array 88, linear array 90, linear array 92, etc. may be provided, except that the linear arrays are all fixed. In this embodiment, relative motion between the water and the linear arrays is provided by causing movement of the water, such as by pumping, by gravity (e.g. by rocking the treatment tank containing the linear arrays), or by some other means for achieving relative motion between the water and the linear arrays of rods. Other arrangements of rods besides the linear arrays illustrated may also be used in some embodiments of the invention, including in embodiments having moving arrays of rods and embodiments having stationary rods and moving water.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A water treatment system comprising:
   a treatment tank;
   a first conductive rod in the treatment tank;
   a second conductive rod in the treatment tank;
   a current generator electrically connected to the first conductive rod and configured to deliver current to the first conductive rod;
   a magnetic pulse generator electrically connected to the second conductive rod and configured to deliver magnetic pulses to the second conductive rod; and
   a mechanism that generates relative motion between water contained in the treatment tank for treating and the first and second conductive rods.

2. A water treatment system as recited in claim 1, further comprising a plurality of the first conductive rod and a plurality of the second conductive rod, and wherein the mechanism that generates relative motion comprises a motor that moves at least one of:
   the plurality of first conductive rods; and
   the plurality of second conductive rods.

3. A water treatment system as recited in claim 2, wherein the plurality of first conductive rods are arranged in a first array and the plurality of second conductive rods are arranged in a second array.

4. A water treatment system as recited in claim 3, wherein the first array is linear and the second array is linear.

5. A water treatment system as recited in claim 4, wherein the motor causes back and forth motion of at least one of the first array and the second array.

6. A water treatment system as recited in claim 3, wherein the first array is circular and the second array is circular, and wherein the first and second arrays are concentric.

7. A water treatment system as recited in claim 6, wherein the motor causes rotational motion of at least one of the first array and the second array.

8. A water treatment system as recited in claim 6, wherein the first array and the second array are counter rotated.

9. A water treatment system as recited in claim 1, further comprising a control system configured to:
   measure a measured conductivity of water in the treatment tank;
   reduce an output current of the current generator as the measured conductivity decreases;
   reduce an output voltage of the magnetic pulse generator as the measured conductivity decreases; and
   reduce an output frequency of the magnetic pulse generator as the measured conductivity decreases.

10. A water treatment system as recited in claim 1, further comprising a filtration system attached to an output of the treatment tank.

11. A water treatment system as recited in claim 1, further comprising means for removing a total dissolved solids slurry from the treatment tank.

12. A water treatment system as recited in claim 1, wherein the first conductive rod and the second conductive rod are substantially parallel.

13. A method for treating water comprising:
   placing water to be treated into a treatment tank, the treatment tank containing:
      a first conductive rod; and
      a second conductive rod;
   applying a first treatment vector to the water through the first conductive rod, the first treatment vector comprising a direct current electrical current;
   applying a second treatment vector to the water by way of the second conductive rod simultaneously to application of the first treatment vector, the second treatment vector comprising a magnetic pulse;
   creating motion of the water relative to the first and second conductive rods during application of the first and second treatment vectors;
   measuring a measured conductivity of the water; and
   continuing application of the first and second treatment vectors until the measured conductivity is less than or equal to a target conductivity.

14. A method for treating water as recited in claim 13, wherein the first conductive rod is one of a plurality of first conductive rods in a first array in the treatment tank and wherein the second conductive rod is one of a plurality of second conductive rods in a second array in the treatment tank.

15. A method as recited in claim 14, wherein the first and second arrays are concentric circular arrays, and wherein creating motion comprises rotating at least one of the first and second arrays.

16. A method as recited in claim 14, further comprising:
reducing a current of the first treatment vector as the measured conductivity decreases;
reducing a voltage of the second treatment vector as the measured conductivity decreases; and
reducing an output frequency of the second treatment vector as the measured conductivity decreases.

17. A method as recited in claim 16, wherein the first treatment vector includes an applied direct-current voltage of between ten and five hundred volts and an applied magnetic pulse voltage of between ten and sixty volts and a magnetic pulse frequency of between two and ten Hertz.

18. A method as recited in claim 17, wherein the first treatment vector begins with an applied direct-current voltage of between two hundred and three hundred volts that decreases to approximately ten volts during the method and wherein the second treatment vector begins with an applied magnetic pulse voltage of between twenty-five and forty volts that decreases to between one and three volts during the method.

19. A water treatment system comprising:
a treatment tank;
a first plurality of a first conductive rod in the treatment tank, the first plurality of first conductive rods being arranged in a first circular array and extending from a first bracket in substantially-parallel fashion;
a second plurality of a second conductive rod in the treatment tank, the second plurality of second conductive rods being arranged in a second circular array that is concentric with the first circular array and the second plurality of second conductive rods extending from a second bracket in substantially-parallel fashion;
a current generator electrically connected to the first conductive rods and configured to deliver current to the first conductive rods;
a magnetic pulse generator electrically connected to the second conductive rods and configured to deliver magnetic pulses to the second conductive rods; and
a motor that rotates at least one of the first circular array of first conductive rods and the second circular array of second conductive rods.

20. A water treatment system as recited in claim 19, further comprising a control system configured to:
measure a measured conductivity of water in the treatment tank;
reduce an output current of the current generator as the measured conductivity decreases;
reduce an output voltage of the magnetic pulse generator as the measured conductivity decreases; and
reduce an output frequency of the magnetic pulse generator as the measured conductivity decreases.

* * * * *